United States Patent
Danilov et al.

(10) Patent No.: US 8,103,643 B2
(45) Date of Patent: Jan. 24, 2012

(54) SYSTEM AND METHOD FOR PERFORMING DISTRIBUTED TRANSACTIONS USING GLOBAL EPOCHS

(75) Inventors: Nikita Yurievich Danilov, Moscow (RU); Eric Barton, Bristol (GB)

(73) Assignee: Oracle America, Inc., Redwood City, CA (US)

( * ) Notice: Subject to any disclaimer, the term of this patent is extended or adjusted under 35 U.S.C. 154(b) by 225 days.

(21) Appl. No.: 12/643,340

(22) Filed: Dec. 21, 2009

(65) Prior Publication Data

US 2011/0153797 A1 Jun. 23, 2011

(51) Int. Cl.
*G06F 7/00* (2006.01)
*G06F 17/00* (2006.01)

(52) U.S. Cl. ...................... 707/704; 707/703
(58) Field of Classification Search ............... None
See application file for complete search history.

(56) References Cited

U.S. PATENT DOCUMENTS

| | | | | |
|---|---|---|---|---|
| 6,167,490 | A * | 12/2000 | Levy et al. | 711/148 |
| 6,775,703 | B1 * | 8/2004 | Burns et al. | 709/228 |
| 7,739,385 | B1 * | 6/2010 | Vinjamuri et al. | 709/226 |
| 7,870,111 | B2 * | 1/2011 | Walker | 707/704 |
| 2004/0220931 | A1 * | 11/2004 | Guthridge et al. | 707/8 |
| 2007/0174428 | A1 * | 7/2007 | Lev Ran et al. | 709/218 |

OTHER PUBLICATIONS

Bernstein, P., Hadzilacos, V., and Goodman, N., "Concurrency Control and Recovery in Database Systems," Addison-Wesley Publishing Company, Jan. 1, 1987, 50 pages.

Fidge, C., "Timestamps in Message-Passing Systems that Preserve the Partial Ordering," Australian Computer Science Communications, vol. 10, No. 1, Feb. 1, 1988, 11 pages.

Lamport, L., "Time, Clocks, and the Ordering of Events in a Distributed Stystem," Communications of the ACM, vol. 21, No. 7, Jul. 1, 1978, 8 pages.

* cited by examiner

*Primary Examiner* — Kuen Lu
*Assistant Examiner* — Tuan A Pham
(74) *Attorney, Agent, or Firm* — Osha • Liang LLP (57) ABSTRACT

A method for performing distributed transactions of a cluster. The method includes, in response to a lock request including a first epoch from a first node, setting a local epoch to a maximum of the first epoch and the local epoch, sending a first lock including the local epoch to the first node, and in response to a conflicting lock request including a second epoch from a second node, setting the local epoch to a maximum of the second epoch and the local epoch, where the conflicting lock request is delayed until after the first lock is released. The method further includes, in response to a reintegration request including a third epoch from the first node, setting the local epoch to a maximum of the third epoch and the local epoch and performing a reintegration based on the reintegration request, where the reintegration is logged using the local epoch.

14 Claims, 7 Drawing Sheets

SYSTEM AND METHOD FOR PERFORMING DISTRIBUTED TRANSACTIONS USING GLOBAL EPOCHS

BACKGROUND

In a data system, transactions refer to groups of operations that are committed or undone as a single unit. In other words, each operation in the transaction is not committed until all the operations are performed. Transaction processing in a standard database has the following benefits: atomicity (i.e., ensures that all or none of the operations in a transaction are performed), consistency (i.e., ensures that a data system remains in a consistent state before and after a transaction), isolation (i.e., ensures that intermediate data of a transaction is not accessible by other operations), and durability (i.e., ensures that once a transaction is reported as successful, the transaction will persist). However, with the advent of distributed transaction systems, transactions must be maintained over multiple servers and/or clients. In other words, a failed operation on a first server may require that an operation on a second server be undone.

Typically, distributed transactions are managed in distributed transaction systems using multi-phase commit protocols. For example, in a two-phase commit protocol, a transaction manager may monitor operations being performed on each server involved in a distributed transaction. In this example, the transaction manager ensures that all servers involved in the transaction only commit after each server has confirmed that their corresponding operations are complete. Alternatively, the transaction manager may instruct all servers involved in the transaction to undo their corresponding operations if any one of the servers fails to perform an operation.

SUMMARY

In general, in one aspect, the invention relates to a computer readable medium embodying instructions executable by the computer to perform method steps for performing a distributed transaction of a number of nodes. The instructions including functionality to, in response to receiving a lock request including a first message epoch from a first cluster node of the number of nodes, set a first local epoch to a maximum of the first message epoch and the local epoch to obtain a second local epoch and send a first lock including the second local epoch to the first cluster node. The instructions further including functionality to, in response to receiving a conflicting lock request including a second message epoch from a second cluster node of the number of nodes, set the second local epoch to a maximum of the second message epoch and the second local epoch to obtain a third local epoch, where the conflicting lock request is delayed until after the first lock is released. The instructions further including functionality to, in response to receiving a reintegration request including a third message epoch from the first cluster node, set the third local epoch to a maximum of the third message epoch and the third local epoch to obtain a fourth local epoch and perform a reintegration based on the reintegration request, where the reintegration is logged using the fourth local epoch.

In general, in one aspect, the invention relates to a system for performing a distributed transaction of a number of nodes. The system includes a processor, and a memory including software instructions for enabling the processor to, in response to receiving a lock request including a first message epoch from a first cluster node of the number of nodes, set a first local epoch to a maximum of the first message epoch and the local epoch to obtain a second local epoch and send a first lock including the second local epoch to the first cluster node. The software instructions further for enabling the processor to, in response to receiving a conflicting lock request including a second message epoch from a second cluster node of the number of nodes, set the second local epoch to a maximum of the second message epoch and the second local epoch to obtain a third local epoch, where the conflicting lock request is delayed until after the first lock is released. The software instructions further for enabling the processor to, in response to receiving a reintegration request including a third message epoch from the first cluster node, set the third local epoch to a maximum of the third message epoch and the third local epoch to obtain a fourth local epoch and perform a reintegration based on the reintegration request, where the reintegration is logged using the fourth local epoch.

In general, in one aspect, the invention relates to a method for performing a distributed transaction of a number of nodes. The method includes, in response to receiving a lock request including a first message epoch from a first cluster node of the number of nodes, setting a first local epoch to a maximum of the first message epoch and the local epoch to obtain a second local epoch and sending a first lock including the second local epoch to the first cluster node. The method further includes, in response to receiving a conflicting lock request including a second message epoch from a second cluster node of the number of nodes, setting the second local epoch to a maximum of the second message epoch and the second local epoch to obtain a third local epoch, where the conflicting lock request is delayed until after the first lock is released. The method further includes, in response to receiving a reintegration request including a third message epoch from the first cluster node, setting the third local epoch to a maximum of the third message epoch and the third local epoch to obtain a fourth local epoch and performing a reintegration based on the reintegration request, where the reintegration is logged using the fourth local epoch.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicated the description.

In general, embodiments of the invention provide a system and method for performing distributed transactions using global epochs. Specifically, distributed redo and undo logs may be used to describe transactions being performed in the cluster such that cluster state may be recovered after a failure. In one or more embodiments, the invention ensures that epochs are propagated and logged throughout a distributed system (i.e., cluster) as the transactions are performed. The value of an epoch may be a numeric value, an alphanumeric value, or any other value capable of being sequenced. In this case, sequencing refers the generation of new epochs, where the epochs may be ordered (i.e., total ordering) throughout the distributed system. Each cluster node in the cluster may maintain a local epoch in volatile storage, where the local epoch represents the latest update being performed in the volatile storage. In this case, the invention ensures epochs are propagated by: (1) setting the local epoch of each cluster node to be a maximum of the local epoch and the message epoch of any incoming messages and (2) setting the message epoch of each cluster node for all outgoing messages to the local epoch.

In one or more embodiments of the invention, the invention uses global epochs to recover from the eviction or failure of cluster nodes. In this case, each cluster node may also maintain an oldest locally volatile epoch ("lvepoch"), which is the earliest epoch associated with updates in volatile storage of the cluster node. A stability coordinator in the cluster may monitor the lvepoch on each cluster node to determine global epochs (e.g., a minimum lvepoch of all cluster nodes) to be used in recovering from evictions and failures. Specifically, the minimum lvepoch may specify the state that should be recovered for the cluster after a failure or eviction.

Figure 1:
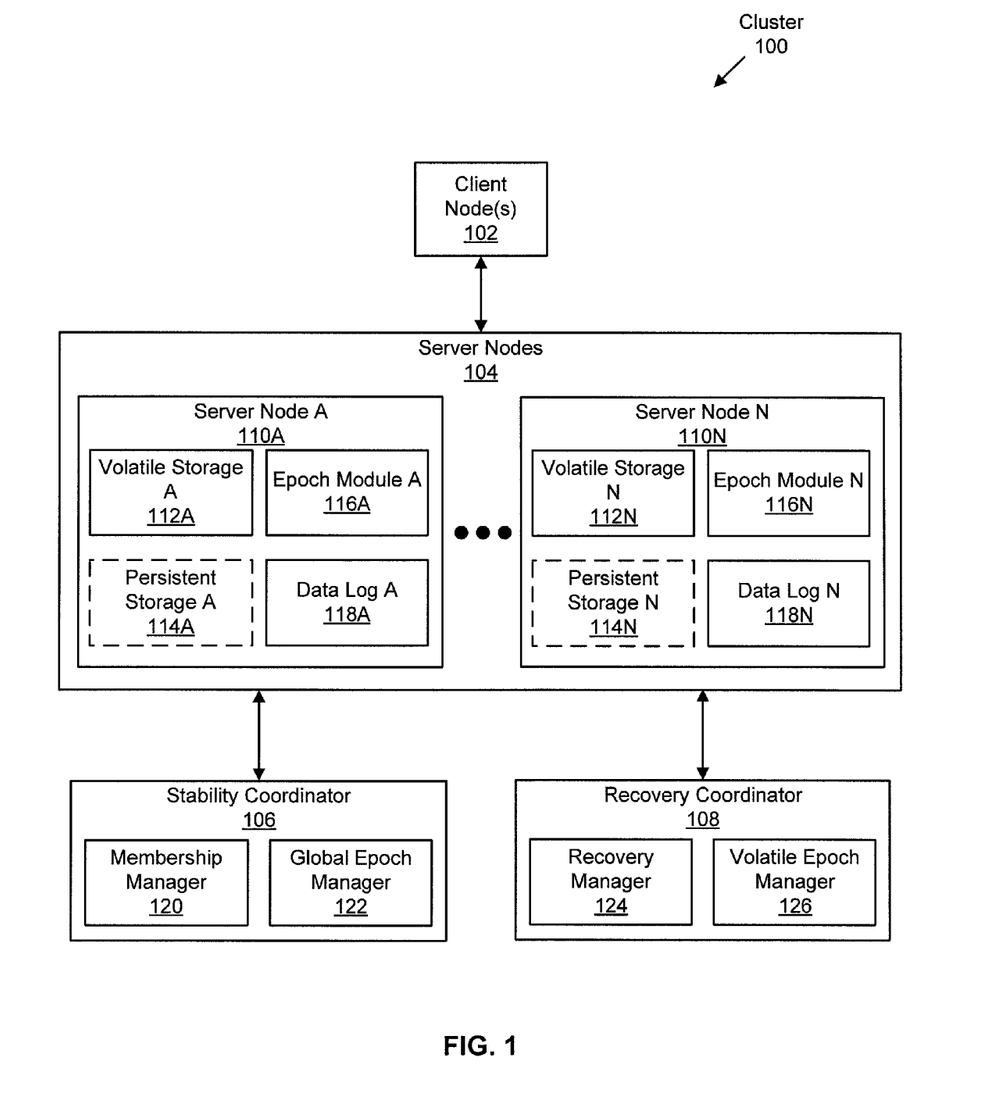
FIG. 1 shows a diagram of a system in accordance with one or more embodiments of the invention.

FIG. 1 shows a diagram of a Cluster (100) in accordance with one or more embodiments of the invention. The Cluster (100) includes Client Node(s) (102) interacting with Server Nodes (104), which are further interacting with a Stability Coordinator (106) and a Recovery Coordinator (108). The Server Nodes (104) further includes Server Node A (110A) and Server Node N (110N). Further, each server node (i.e., Server Node A (110A), Server Node N (110N)) is connected to the other server nodes in the Cluster (100) by some form of network connection (e.g., wired, wireless, or any combination thereof). As shown in FIG. 1, each server node (i.e., Server Node A (110A), Server Node N (110N)) includes volatile storage (Volatile Storage A (112A), Volatile Storage N (112N)), persistent storage (Persistent Storage A (114A), Persistent Storage N (114N)), an epoch module (Epoch Module A (116A), Epoch Module N (116N)), and a data log (Data Log A (118A), Data Log N (118N)). The Stability Coordinator (106) further includes a Membership Manager (120) and a Global Epoch Manager (122). The Recovery Coordinator (108) further includes a Recovery Manager (124) and a Volatile Epoch Manager (126). Each of the aforementioned components of FIG. 1 is discussed below.

Client Node(s) (102) may be any computing device, as discussed below, capable of accessing data from the Server Nodes (104). For example, each of the Client Node(s) (102) may access distributed data of the Server Nodes (104) over a Local Area Network or a Wide Area Network (i.e., the Internet). The Client Node(s) (102) include volatile storage (not shown) for storing the distributed data from the Server Nodes (104). In one or more embodiments of the invention, the Client Node(s) (102) are configured to send reintegration requests, as discussed below, to the Server Nodes (104). Further, each of the Client Node(s) may also be configured to maintain a local epoch as discussed below with respect to the Server Nodes (104).

Server Nodes (104) may be any computing device, as discussed below, capable of managing distributed data of the Cluster (100). More specifically, each server node (e.g., Server Node A (110A), Server Node N (110N)) in the Cluster (100) may be configured to store and provide distributed data to the Client Node(s) (102). For example, the Server Nodes (104) may be a distributed file system, a distributed database system, or some other type of distributed storage system. The Server Nodes (104) (e.g., Server Node A (110A), Server Node N (110N)) may be configured to perform distributed transactions for the Cluster (100) by tracking epochs of operations in the Cluster (100). Each of the Server Nodes (104) may be configured to join and part from the Cluster (100). Further, each of the Server Nodes (104) may be configured to be forcibly parted from the Cluster (100) by another server node in the Cluster (100) (i.e., evicted).

Those skilled in the art will appreciate that an operation is a primitive distributed modification of state that alters the distributed state of the Cluster (100) from one consistent state to another consistent state. In this case, the operation is primitive because without such a qualification a valid sequence of operations would itself be an operation. Further, an operation includes updates for each of the Server Nodes (104) involved in the operation. In this case, a reintegration of an operation is a process by which a server node (e.g., Server Node A (110A), Server Node N (110N)) requests other server nodes to execute updates of the operation, thereby effecting a state change in the storage of the other server nodes. In one or more embodiments of the invention, each operation and update in the Cluster (100) is assigned a message epoch equal to the local epoch of the server node (e.g., Server Node A (110A), Server Node N (110N)) originating the reintegration request. In this case, the operations and updates in the Cluster (100) may be partially ordered based on the message epochs.

In one or more embodiments of the invention, each server node (e.g., Server Node A (110A), Server Node N (110N)) in the Cluster (100) is configured to perform updates in volatile storage (Volatile Storage A (112A), Volatile Storage N (112N)) before the results are stored in persistent storage (Persistent Storage A (114A), Persistent Storage N (114N)). Volatile storage (Volatile Storage A (112A), Volatile Storage N (112N)) may be any storage device requiring power to maintain stored data (e.g., random access memory, processor cache, etc.). Persistent storage (Persistent Storage A (114A), Persistent Storage N (114N)) may be any storage device capable of maintaining stored data without power (e.g., hard disk(s), flash memory, etc.). For example, persistent storage may correspond to a hard disk array configured to be fault tolerant by storing replicated data among multiple hard disks.

Each server node (e.g., Server Node A (110A), Server Node N (110N)) with persistent storage (Persistent Storage A (114A), Persistent Storage N (114N)) may be configured to support transactions, which are used to ensure that a sequence of updates, performed in a volatile storage, are stored in persistent storage atomically. Further, two updates are conflicting if results of the updates, including an indication of success or failure, and the final state of the corresponding server node are dependent on the order of execution of the updates (i.e., one update should be executed prior to the execution of the other update). In this case, for a particular update, a server node (e.g., Server Node A (110A), Server Node N (110N)) may be configured to request a lock from the target node of the update prior to requesting a reintegration of the update. The lock from the target node delays requests for locks with conflicting updates from other nodes until the initial lock is either released or the server node leaves the cluster. Those skilled in the art will appreciate that locks are obtained for a portion (e.g., a database table, a database entry, a file, etc.) of persistent storage in the target node that is to be updated in a reintegration.

In one or more embodiments of the invention, each server node (e.g., Server Node A (110A), Server Node N (110N)) in the Cluster (100) is configured to use an epoch module (i.e., Epoch Module A (116A) and Epoch Module N (116N)) to manage epochs related to operations in the Cluster (100). Specifically, the epoch module (i.e., Epoch Module A (116A) and Epoch Module N (116N)) may be configured to maintain a local epoch in volatile storage (Volatile Storage A (112A), Volatile Storage N (112N)) of the server node, where the local epoch represents the latest update stored in the volatile storage. In this case, the local epoch is maintained at each server node (e.g., Server Node A (110A), Server Node N (110N)) by assigning the value of the local epoch to a maximum of a message epoch of each incoming messages to the server node and the local epoch. Further, each server node (e.g., Server Node A (110A), Server Node N (110N)) is configured to propagate epochs throughout the Cluster (100) by assigning the value of the message epoch of each outgoing message to the local epoch of the server node. In one or more embodiments of the invention, the assignment of the local epoch and the message epoch are mutually atomic (i.e., each assignment may not occur concurrently).

In one or more embodiments of the invention, the epoch module (i.e., Epoch Module A (116A) and Epoch Module N (116N)) may also be configured to maintain an oldest locally volatile epoch ("lvepoch"), which is the earliest epoch associated with updates that are stored in volatile storage (Volatile Storage A (112A), Volatile Storage N (112N)) but are not persisted in persistent storage (Persistent Storage A (114A), Persistent Storage N (114N)) of the server node (e.g., Server Node A (110A), Server Node N (110N)). The stability of epochs may be determined by monitoring the lvepoch of all Server Nodes (104) as discussed below with respect to the Stability Coordinator (106).

In one or more embodiments of the invention, the epoch module (i.e., Epoch Module A (116A) and Epoch Module N (116N)) may also be configured to advance the local epoch of the server node (e.g., Server Node A (110A), Server Node N (110N)). Further, the epoch module (i.e., Epoch Module A (116A) and Epoch Module N (116N)) may advance the local epoch of the server node (e.g., Server Node A (110A), Server Node N (110N)) independent of the other server nodes in the Cluster (100). Examples of when the epoch module (i.e., Epoch Module A (116A) and Epoch Module N (116N)) may advance the local epoch include, but are not limited to, during each reintegration, on a timeout, after a specified number of updates are performed at the current local epoch. Further, the Cluster (100) may be configured to selectively allow server nodes (e.g., Server Node A (110A), Server Node N (110N)) to advance the local epoch.

Those skilled in the art will appreciate that managing the local epoch of each of the Client Nodes (102) and each of the Server Nodes (104) as described above ensures that the local epoch of each node increases monotonically over time. Specifically, the local epoch increases monotonically because the local epoch is only modified by either (1) setting the local epoch to a maximum of a message epoch of an incoming message and the local epoch and (2) advancing (i.e., incrementing) the local epoch when certain conditions are satisfied. Further, a collection of all updates for a specified epoch is a collection of updates for some set of operations (i.e., an epoch contains no partial operations) because each update for a particular operation is sent with the same epoch.

In addition, for any sequence of conflicting updates, the epochs of the sequence of conflicting updates is also monotonically increasing. Specifically, the local epoch monotonically increases when (i) a lock request is received, (ii) a lock is provided, (iii) a reintegration is performed, (iv) a conflicting lock request is received, (v) a lock is released, (vi) a subsequent lock is provided, (vii) and a subsequent reintegration is performed. In other words, the partial ordering of local epochs is compatible with the causal ordering of conflicting updates. For example, a cluster node requesting a conflicting lock is required to set a corresponding local epoch to a lock epoch of the conflicting lock, which is greater than or equal to the reintegration epoch of a first update, before sending a subsequent reintegration request for a second update with the local epoch (i.e., the subsequent reintegration request has an epoch greater than or equal to the epoch of the subsequent lock obtained by the cluster node).

For each of the Client Nodes (102) and Server Nodes (104), the collection of updates in all epochs less than or equal to the particular epoch contains updates from all operations reintegrated by the node before some moment in the node's physical time and contains no updates from operations reintegrated by the node after the moment in the node's physical time (i.e., the particular epoch defines a boundary in the set of updates, which is consistent with a state snapshot of the node).

In one or more embodiments of the invention, each server node (e.g., Server Node A (110A), Server Node N (110N)) in the Cluster (100) is configured to use a data log (i.e., Data Log A (118A) and Data Log N (118N)) to log operations and updates related to the server node. Specifically, each data log (i.e., Data Log A (118A) and Data Log N (118N)) may include a redo log and an undo log for describing operations and updates related to each server node (e.g., Server Node A (110A), Server Node N (110N)). In this case, the undo log of each server node (e.g., Server Node A (110A), Server Node N (110N)) includes undo entries for all updates performed on the server node that have not been confirmed as persisted throughout the Cluster (100) (i.e., all updates with an epoch greater than or equal to the minimum lvepoch of the Cluster (100)), where each undo entry is configured to restore the server node to a state prior to performing a corresponding update. Further, the redo log of each server node (e.g., Server Node A (110A), Server Node N (110N)) includes redo entries for all updates performed on the server node that are stored in persistent storage (Persistent Storage A (114A), Persistent Storage N (114N)), where each redo entry is configured to redo a corresponding update.

In one or more embodiments of the invention, the Stability Coordinator (106) is configured to monitor all the Server Nodes (104) to manage operations in the Cluster (100). The Stability Coordinator (106) may correspond to one of the Server Nodes (104). In other cases, the Stability Coordinator (106) may correspond to a cluster node dedicated to managing operations in the Cluster (100). The Stability Coordinator (106) may be configured to use a Membership Manager (120) to monitor the membership of the Cluster (100). Specifically, the Stability Coordinator may be configured to monitor activities such as when a server node (e.g., Server Node A (110A), Server Node N (110N)) leaves or joins the Cluster (100). Further, the Stability Coordinator (106) may be configured to use a Global Epoch Manager (122) to monitor epoch information of all Server Nodes (104) that are members of the Cluster (100). More specifically, the Stability Coordinator (106) may be configured to monitor the lvepoch of each of the Server Nodes (104) that are members of the Cluster (100). For example, each of the Server Nodes (104) may be configured to periodically send a lvepoch to the Stability Coordinator (106). In this example, the Stability Coordinator (106) broadcasts a minimum lvepoch of all Server Nodes (104) in the Cluster (100) when the minimum lvepoch changes.

In one or more embodiments of the invention, the Recovery Coordinator (108) is configured to manage recoveries of the Cluster (100). The Recovery Coordinator (108) may correspond to one of the Server Nodes (104). In other cases, the Recovery Coordinator (108) may correspond to a cluster node dedicated to managing recoveries of the Cluster (100). The Recovery Coordinator (108) may be configured to use a Volatile Epoch Manager (126) to maintain an oldest somewhere volatile epoch ("svepoch"). The Recovery Coordinator (108) may also be configured to manage a recovery following a node failure using the Recovery Manager (124). Specifically, the Recovery Manager (124) may be configured to return the Cluster (100) to a state consistent with the svepoch as described below with respect to FIG. 6.

Figure 2:
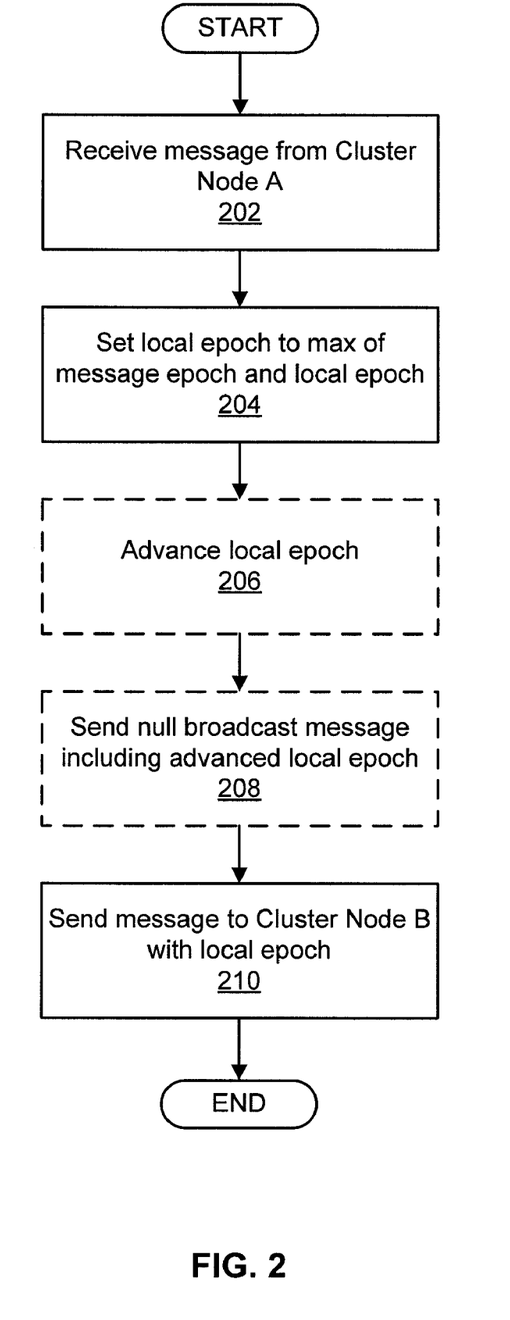
FIGS. 2-6 show flowcharts of methods in accordance with one or more embodiments of the invention.

FIG. 2 shows a flowchart of a method for performing distributed transactions in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In step 202, a message including a message epoch is received from Cluster Node A. Cluster Node A is a member of a cluster including both client nodes and server nodes. In the cluster, messages transmitted by each of the cluster nodes are associated with a message epoch. Examples of messages include, but are not limited to, reintegration requests, lock requests, lock revocations, epoch broadcasts, volatile notifications, recovery requests, and node eviction requests.

In step 204, a local epoch is set to maximum of the message epoch and the local epoch. The local epoch is stored in volatile memory and represents the latest potential update being performed in the volatile storage. In other words, the local epoch is set to a maximum of the local epoch and the message epoch of each incoming message from other nodes in the cluster. By always setting the local epoch to a maximum of the message epoch and the local epoch, the local epoch is ensured to continually increase in value or remain the same as messages are received.

Optionally, in step 206, the local epoch is advanced independent of messages received from other nodes. More specifically, the local epoch may be incremented if predefined conditions are satisfied. Predefined conditions for advancing the local epoch include, but are not limited to, during each reintegration, on a timeout, after a specified number of updates are performed in the current local epoch, etc.

Optionally, in step 208, a null broadcast message including the local epoch is sent to other nodes in the cluster. Null broadcast messages may be sent to other nodes in the cluster to increase the speed at which notifications of the advanced epoch are communicated across the cluster. In some cases, the null broadcast message is sent to each node in the cluster. Those skilled in the art will appreciate that synchrony is not required for null messages (i.e., different cluster nodes may simultaneously send null broadcast messages).

In step 210, a message including the local epoch is sent to Cluster Node B. Further, all messages sent to other nodes in the cluster include the local epoch. Each of the other nodes in the cluster may also perform steps 202 to 210 in response to receiving a message including the local epoch, allowing the local epoch to be propagated throughout the cluster. Further, assignments as described above in step 204 and step 210 may be mutually atomic (i.e., the assignment of step 204 may not occur at the same time as the assignment of step 210).

Figure 3:
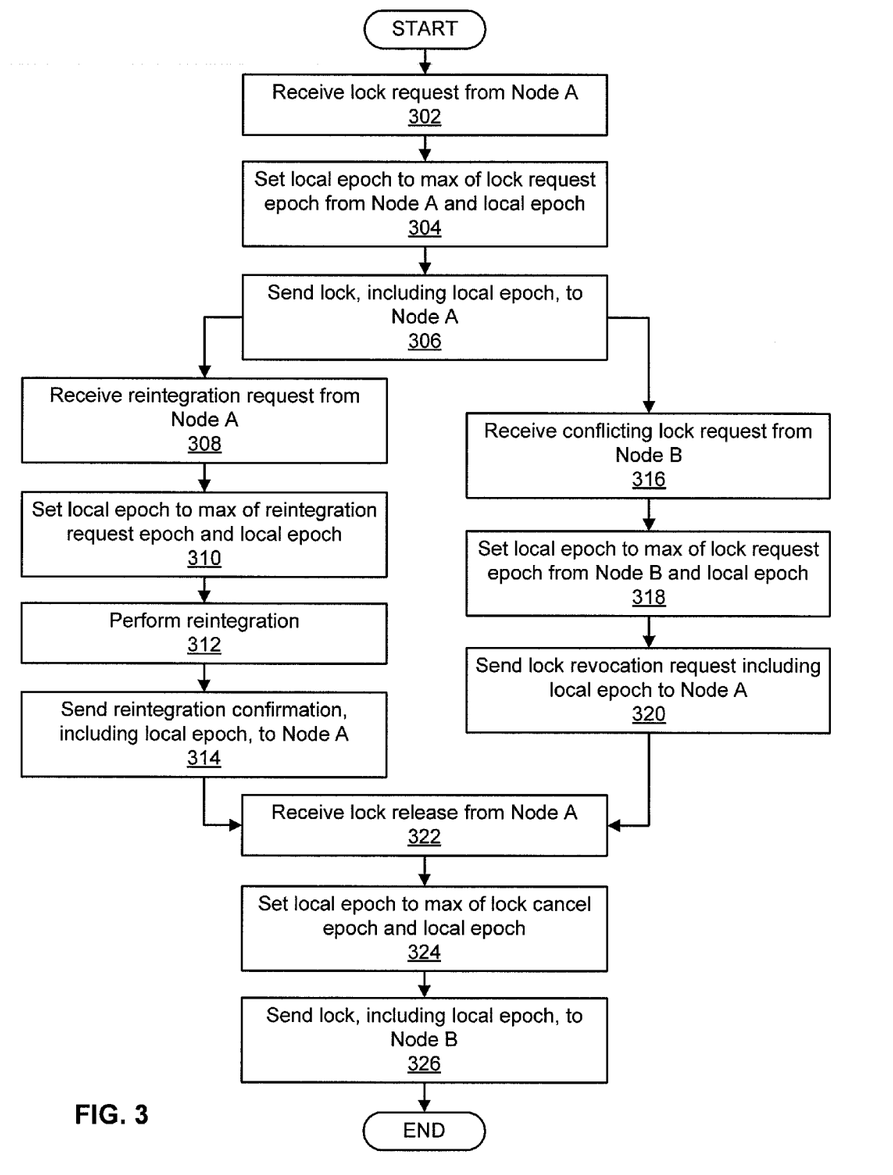

FIG. 3 shows a flowchart of a method for performing reintegrations in accordance with one or more embodiments of the invention. The method of FIG. 3 may be implemented, for example, using the system of FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In step 302, a lock request including a lock request epoch is received from Cluster Node A. The lock request may correspond to a request for a lock on a location in a portion (e.g., a database table, a database entry, a file, etc.) of persistent storage that is to be updated in a reintegration. In response to receiving the lock request, the local epoch may be set to a maximum of the lock request epoch from Cluster Node A and the local epoch (step 304). If there are no existing locks for the portion of persistent storage, a lock including the local epoch is sent to Cluster Node A (step 306).

In step 308, a reintegration request including a reintegration epoch is received from Cluster Node A. The reintegration request may also include updates to be performed in persistent storage, where the updates are related to an operation. Further, Cluster Node A may create an entry including the reintegration epoch in a redo log when sending the reintegration request. In response to receiving the reintegration request, the local epoch may be set to a maximum of the reintegration epoch and the local epoch (step 310).

In step 312, the reintegration (i.e., updates specified in the reintegration request) is performed. Specifically, the updates specified in the reintegration request are performed in volatile storage before being committed to persistent storage. When the reintegration is performed, an entry related to the integration may be created in an undo log with the reintegration epoch. Once the updates are performed, a reintegration confirmation including the local epoch is sent to Cluster Node A (step 314).

In step 316, a conflicting lock request including a conflicting lock request epoch is received from Cluster Node B. The conflicting lock request is related to the portion of persistent storage; thus, a response to the conflicting lock request is delayed until the lock provided to Cluster Node A is released. In response to receiving the lock request, the local epoch may be set to a maximum of the lock request epoch from Cluster Node B and the local epoch (step 318).

In step 320, a lock revocation request including the local epoch is sent to Cluster Node A. Those skilled in the art will appreciate that steps 308 to 314 and steps 316 to 320 are shown in FIG. 3 as occurring concurrently. However, as discussed above with respect to FIG. 2, the assignment of the local epoch to the message epoch of an incoming message and the assignment of a message epoch in an outgoing message to the local epoch are mutually atomic (e.g., step 310, step 314, step 318, step 320).

In step 322, a lock release request including a lock release epoch is received from Cluster Node A. In response to receiving the lock release request, the lock to Cluster Node A is released and the local epoch is set to a maximum of the lock release epoch and the local epoch (step 324).

In step 326, a second lock including the local epoch is sent to Cluster Node B. More specifically, the second lock including the local epoch as modified by steps 302 to 324 is sent to Cluster Node B (i.e., local epoch as modified by steps 302 to 324 is propagated to Cluster Node B).

FIG. 3 only shows a single-level reintegration, where execution of an update requires no further reintegrations.

Those skilled in the art will appreciate that the workflow of FIG. 3 may be extended to handle multi-level reintegrations.

Figure 4:
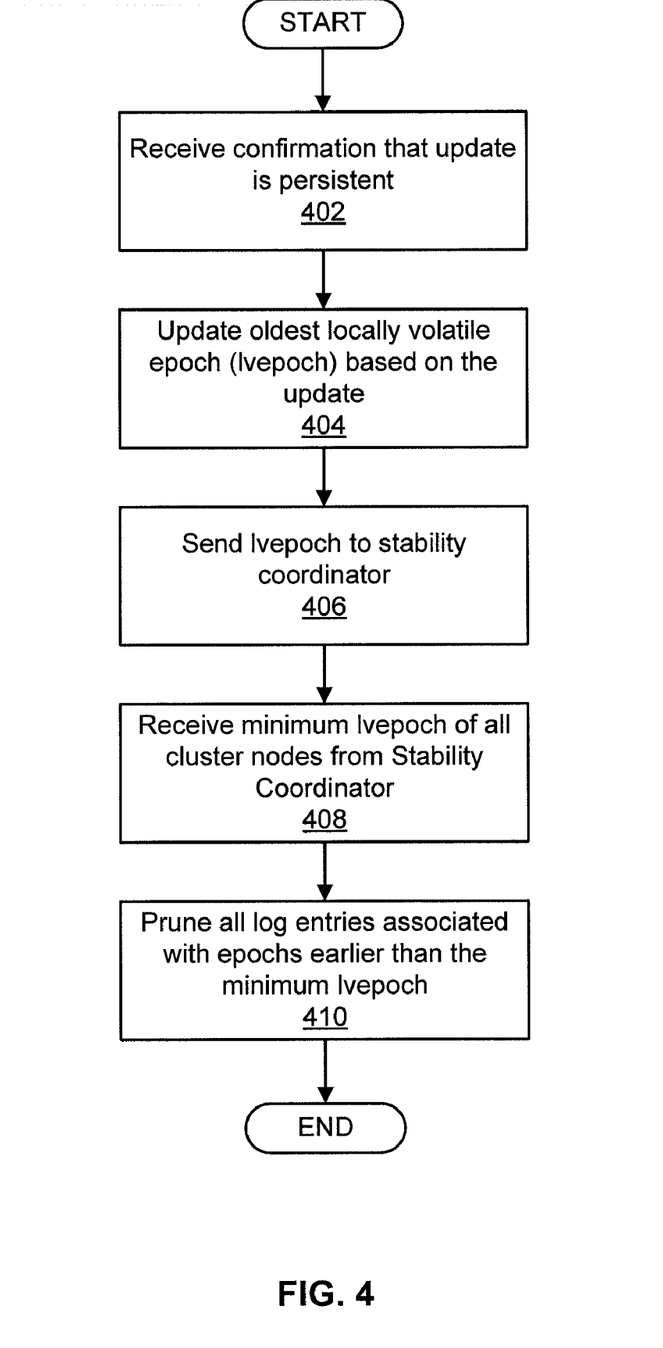

FIG. 4 shows a flowchart of a method for pruning epochs in accordance with one or more embodiments of the invention. The method of FIG. 4 may be implemented, for example, using the system of FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

In step 402, confirmation that an update is persisted is received. Specifically, confirmation is received that an update previously stored in volatile storage is now stored in persistent storage. Those skilled in the art will appreciate that once the update is stored in persistent storage, the update is capable of persisting after a failure (i.e., persists after a loss of power).

In step 404, the oldest locally volatile epoch ("lvepoch") is updated in persistent storage based on the persisted update. Specifically, if all of the volatile updates associated with the current local epoch are persisted, the lvepoch may be advanced to the earliest epoch of the remaining volatile updates.

In step 406, the lvepoch is sent to a stability coordinator. In some cases, the lvepoch may be transmitted to the stability coordinator when the value of the lvepoch is modified. In other cases, the lvepoch may be sent to the stability coordinator periodically or in response to a request for the lvepoch. The stability coordinator may maintain a list of lvepoch values for all cluster nodes in the cluster.

In step 408, the minimum lvepoch of all cluster nodes is received from the stability coordinator. The stability coordinator is configured to monitor the lvepoch of each node in the cluster. Further, when the minimum lvepoch of all the cluster nodes is modified, the stability coordinator may send the minimum lvepoch to each cluster node. The minimum lvepoch confirms that updates associated with all epochs less than the minimum lvepoch are persisted on all nodes in the cluster and, thus, can be pruned from undo logs.

In response to receiving the minimum lvepoch, all log entries associated with epochs earlier than the minimum lvepoch are pruned (step 410). Specifically, all undo log entries for updates associated with epochs earlier than the minimum lvepoch may be pruned (i.e., removed) from the undo log. Further, all redo logs entries associated with the pruned undo log entries may also be pruned from the redo log. Those skilled in the art will appreciate that each node in the cluster may perform steps 402-410 to prune entries from a corresponding undo log and redo log.

Figure 5A:
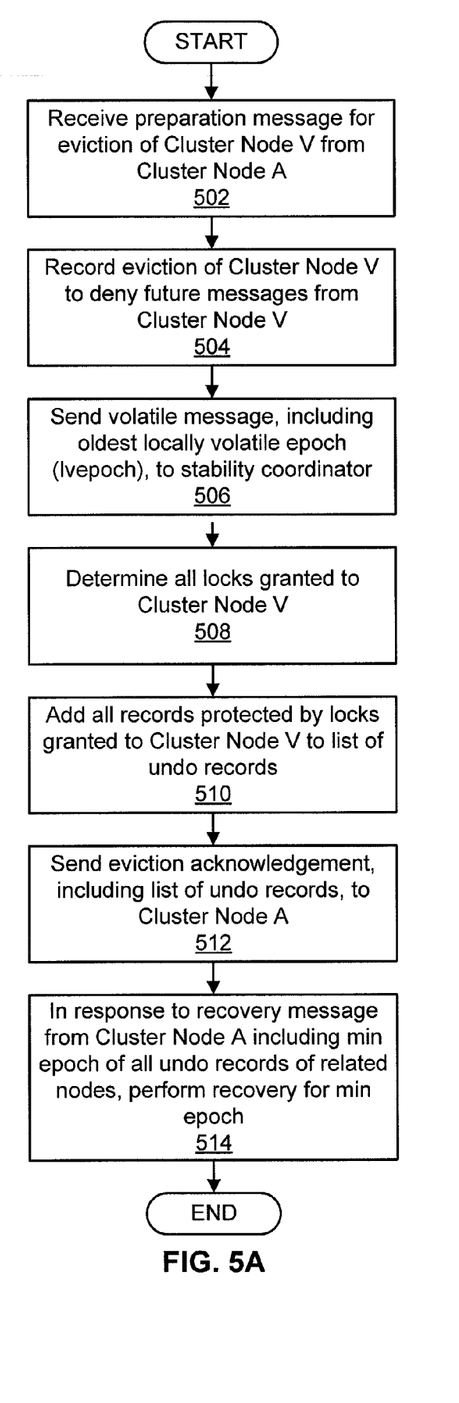
Figure 5B:
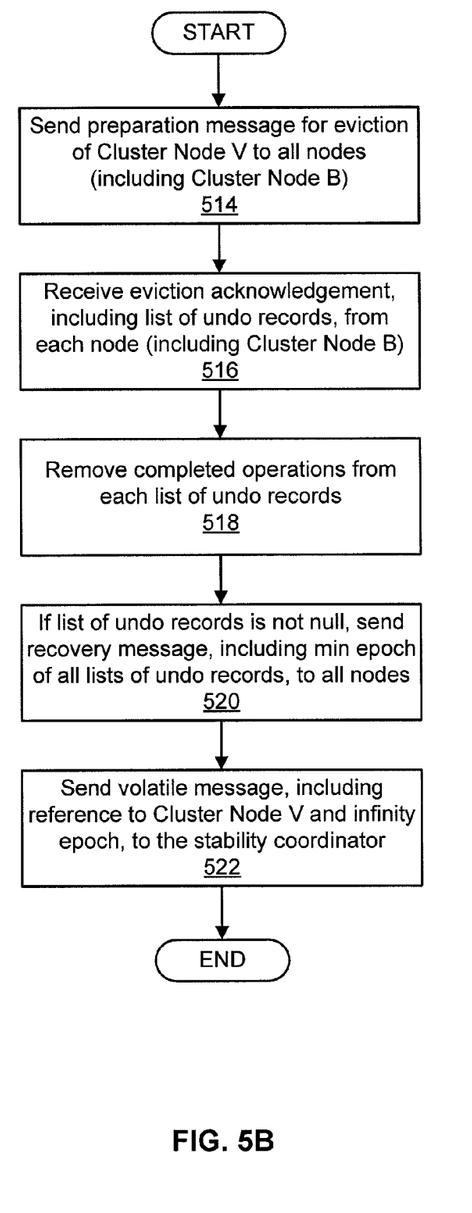

FIGS. 5A-5B show flowcharts of a method for evicting a cluster in accordance with one or more embodiments of the invention. The method of FIGS. 5A-5B may be implemented, for example, using the system of FIG. 1. In one or more embodiments of the invention, one or more of the steps shown in FIGS. 5A-5B may be omitted, repeated, and/or performed in a different order than the order shown in FIGS. 5A-5B. Accordingly, the scope of the invention should not be considered limited to the specific arrangement of steps shown in FIGS. 5A-5B.

FIG. 5A shows a flowchart for the eviction of Cluster Node V from the perspective of Cluster Node B. In step 502, a preparation message for the eviction of Cluster Node V is received from Cluster Node A. An eviction occurs when a node without persistent storage (e.g., a client node) fails. In this case, another node in the cluster (i.e., Cluster Node A) is responsible for restoring the cluster to a consistent state after the eviction of Cluster Node V.

In step 504, the eviction of Cluster Node V is recorded, and future messages received from Cluster Node V are denied. In other words, once Cluster Node V is evicted, Cluster Node V is no longer allowed to send messages to any nodes in the cluster.

In step 506, a volatile message including an oldest locally volatile epoch ("lvepoch") is sent to the Stability Coordinator. In addition, all outstanding locks granted to Cluster Node V are determined (step 508). Specifically, all the locks granted to Cluster Node V for updates to be performed in specific portions of persistent storage of Cluster Node B are determined. In response to determining the locks granted to Cluster Node V, all entries in an undo log associated with the portions of persistent storage that are protected by the locks granted to Cluster Node V are added to a list of undo records (step 510). An eviction acknowledgement including the list of undo records is sent to Cluster Node A (step 512).

In response to a recovery message from Cluster Node A including a minimum epoch for uncompleted undo records of all related nodes, a recovery for the minimum epoch is performed (step 514). In this case, all related nodes correspond to the nodes that may have volatile updates for Cluster Node V. The recovery may be performed as discussed below with respect to FIG. 6.

Those skilled in the art will appreciate that steps 502 to 514 may be performed by each of the related nodes.

FIG. 5B shows a flowchart for the eviction of Cluster Node V from the perspective of Cluster Node A. In step 514, a preparation message for the eviction of Cluster Node V is sent to all related nodes of the cluster, including Cluster Node B. As discussed above, all related nodes correspond to the nodes that may have volatile updates for Cluster Node V.

In step 516, an eviction acknowledgement, including a list of undo records, is received from each of the related nodes, including Cluster Node B. Each of the list of undo records are then analyzed to remove all entries that are related to completed operations (step 518). If an update is related to a completed operation, the update does not have to be undone and may be ignored during the eviction of Cluster Node V.

In step 520, a recovery message, including a minimum epoch of all remaining records in each of the list of undo records, is sent to each of the related nodes. Those skilled in the art will appreciate that if a list of undo records is empty after performing step 518, no recovery message is sent to the corresponding related node. Thus, if all lists of undo records are empty after performing step 518, step 520 may be skipped in the workflow.

In step 522, a volatile message including a reference to Cluster Node V and an infinity epoch is sent to the Stability Coordinator. The infinity epoch ensures that Cluster Node V has no effect on future minimum lvepoch determinations made by the Stability Coordinator.

Those skilled in the art will appreciate that the method for evicting nodes from the cluster may be optimized in a variety of manners. Examples of optimizations include, but are not limited to, Cluster Node B omitting any local operations from the list of undo records, performing a tree reduction of the list of undo records, and forcing cluster nodes to store updates to persistent memory when Cluster Node V is evicted (i.e., commit-on-evict), which reduces the risk of future recoveries failing due to the redo log of Cluster Node V being unavailable.

Figure 6:
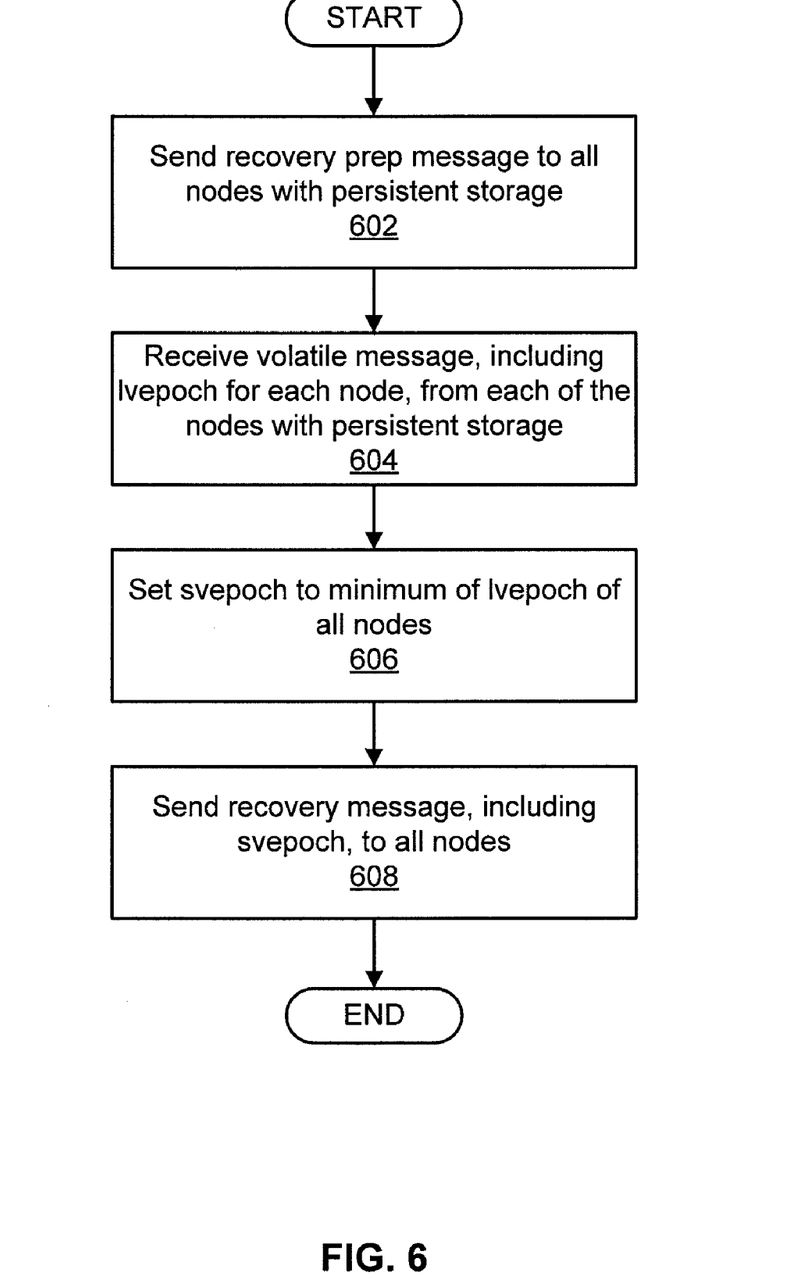

FIG. 6 shows a flowchart of a method for recovering a cluster in accordance with one or more embodiments of the invention. The method of FIG. 6 may be implemented, for example, using the system of FIG. 1. In one or more embodiments of the invention, one or more of the steps shown in FIG.

6 may be omitted, repeated, and/or performed in a different order than the order shown in FIG. 6. Accordingly, the scope of the invention should not be considered limited to the specific arrangement of steps shown in FIG. 6.

For the purposes of FIG. 6, it is assumed that the transaction system on the cluster nodes with persistent storage maintains commit ordering. For example, if transactions T0 and T1 contain conflicting updates U0 and U1, U0 precedes U1 in time; and if T1 has been committed to the persistent storage, then T0 has also been committed to persistent storage. Further, if a pair of transactions has multiple conflicting updates, it is assumed that each of the conflicting updates are in the same order, otherwise the pair transactions are not serializable (i.e., capable of executing the transactions as if the transactions were executed one after the other).

In step 602, a recovery preparation message is sent to all nodes in the cluster with persistent storage from the Recovery Coordinator. The Recovery Coordinator may be the cluster node that failed and restarted, initiating the recovery process. Further, the Recovery Coordinator is configured to maintain an oldest somewhere volatile epoch ("svepoch") for all nodes in the cluster.

In step 604, a volatile message including the oldest locally volatile epoch ("lvepoch") is received from each node with persistent storage in the cluster. In response to receiving the lvepoch from each node, the svepoch is set to the minimum lvepoch of all nodes with persistent storage in the cluster (step 606).

In step 608, a recovery message including the svepoch is sent to each node with persistent storage in the cluster. In response to receiving the recovery message, each node with persistent storage in the cluster undoes all updates with entries in a corresponding undo log with epochs greater than or equal to the svepoch. Further, once the undoes of all updates are complete, each client node is requested to resubmit entries in a corresponding redo log with epochs greater than or equal to the svepoch before the client node may submit new reintegration requests. Alternatively, if the redo log of a client node is unavailable due to a client node failure, version-based recovery (i.e., LUSTRE™ recovery) may be used to allow for out-of-order replay of the redo logs of the remaining client nodes. LUSTRE™ is a registered trademark of Sun Microsystems™, Inc. located in Santa Clara, Calif.

Those skilled in the art will appreciate that steps 602 to 608 may correspond to a two-phase commit protocol. In this case, server nodes may be configured to maintain some persistent state to guarantee recovery progress in the case of repeated failures.

Figure 7:
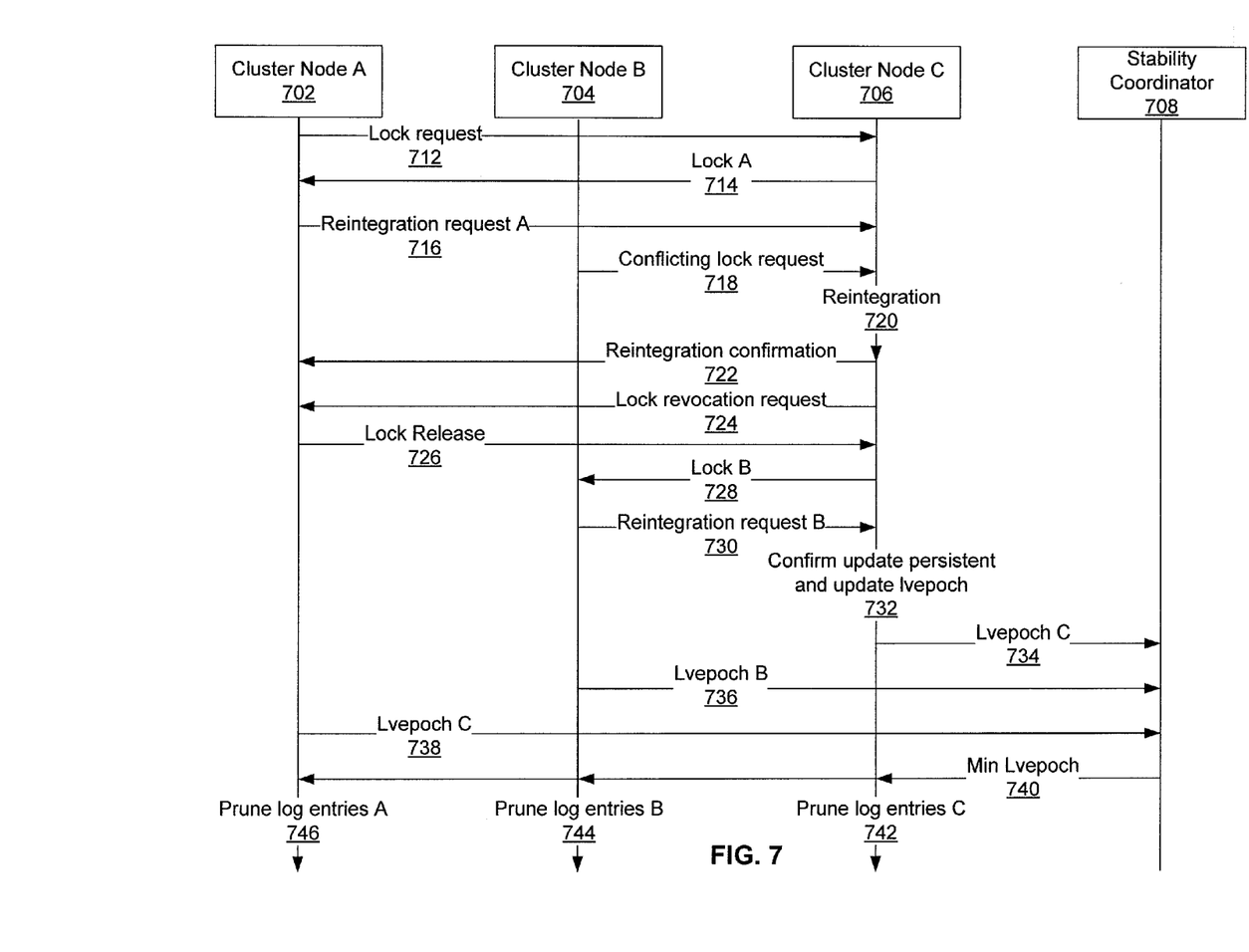
FIG. 7 shows an example in accordance with one or more embodiments of the invention.

FIG. 7 shows a flow chart for performing a distributed transaction in accordance with one or more embodiments of the invention. In one or more embodiments of the invention, one or more of the steps shown in FIG. 7 may be omitted, repeated, and/or performed in a different order than that shown in FIG. 7. Accordingly, the specific arrangement of steps shown in FIG. 7 should not be construed as limiting the scope of the invention. Those skilled in the art will appreciate that the following example is provided for exemplary purposes only and accordingly should not be construed as limiting the scope of the invention.

In this example, each of the cluster nodes (i.e., Cluster Node A (702), Cluster Node B (704), and Cluster Node C (706)) may maintain a local epoch. The local epoch of each of the cluster nodes is set to a maximum of a message epoch of each incoming message (e.g., lock request (step 712), reintegration request A (step 716), etc.) and the local epoch. Further, each outgoing message from each of the cluster nodes includes a message epoch set to the local epoch of the cluster node. As discussed above with respect to FIG. 1, the assignments of the local epoch using incoming messages and the assignments of the message epoch of outgoing messages using the local epoch are mutually atomic. Further, the value of each local epoch is shown in square brackets following the local epochs.

In step 712, Cluster Node A (702) sends a lock request including local epoch A [2] to Cluster Node C (706). The lock request is associated with a portion of persistent storage C in the Cluster Node C (706). In this example, Cluster Node C (706) may be a server node as described above with respect to FIG. 1.

In response to the lock request, Cluster Node C (706) sets local epoch C [1] to a maximum of local epoch A [2] and local epoch C [1] and sends lock A with local epoch C [2] to Cluster Node A (702) (step 714). Once Cluster Node A (706) receives lock A, Cluster Node A (702) sets local epoch A [2] to a maximum of local epoch C [2] and local epoch A [2] and then sends a reintegration request A including local epoch A [2] and an update A of the portion of persistent storage C to Cluster Node C (706) (step 716).

In step 718, Cluster Node B (704) sends a conflicting lock request including local epoch B [1] to Cluster Node C (706) (step 718). The conflicting lock request is associated with the same portion of persistent memory C in Cluster Node C (706). In response to receiving the conflicting lock request, Cluster Node C (706) sets local epoch C [2] to a maximum of local epoch B [1] and local epoch C [2].

In step 720, Cluster Node C (706) performs the update A included in reintegration request A in volatile storage C and creates an entry in undo log A for the update A having an update epoch [2]. Cluster Node C (706) sends a reintegration confirmation including local epoch C [2] to Cluster Node A (702).

In step 724, Cluster Node C (706) also sends a lock revocation request including local epoch C [2] to Cluster Node A (702). In response to receiving the lock revocation request, Cluster Node A (702) sets local epoch A [2] to a maximum of local epoch C [2] and local epoch A [2]. In step 726, Cluster Node A (702) sends a lock release including local epoch A [2] to Cluster Node C (706). In response to receiving the lock release, Cluster Node C (706) sets local epoch C [2] to a maximum of local epoch A [2] and local epoch C [2].

In step 728, Cluster Node C (706) sends lock B including local epoch C [2] to Cluster Node B (704). In response to receiving lock B, Cluster Node B (704) sets local epoch B [1] to a maximum of local epoch C [2] and local epoch B [1] and then advances local epoch B [3].

In step 730, Cluster Node B (704) sends reintegration request B including local epoch B [3] and an update B to Cluster Node C (706). In response to receiving the reintegration request B, Cluster Node C (706) sets local epoch C [2] to a maximum of local epoch B [3] and local epoch C [2].

Once Cluster Node C (706) determines that the update A is stored in persistent storage C, Cluster Node C (706) sets an oldest locally volatile epoch ("lvepoch") to [3] because update B is the oldest locally volatile epoch and has an update epoch of [3] (step 732). In step 734, Cluster Node C (706) sends lvepoch C [3] to Stability Coordinator (708).

In step 736, Cluster Node B (704) sends lvepoch B [3] to Stability Coordinator (708). In step 738, Cluster Node A (702) sends lvepoch A [2] to Stability Coordinator (708). After receiving a lvepoch from each cluster node, Stability Coordinator (708) sends a minimum lvepoch [2] of all cluster nodes with persistent storage (i.e., Cluster Node C (706), Cluster Node B (704) and Cluster Node A (702)) (step 740).

In response to receiving minimum lvepoch [2], Cluster Node C (706) prunes log entries from undo log C with an epoch less than the minimum lvepoch [2] (step 742). Further, entries from redo log A of Cluster Node A (702) that are associated with the entries pruned from undo log C are also pruned.

In response to receiving minimum lvepoch [2], Cluster Node B (704) prunes log entries from undo log B with an epoch less than the minimum lvepoch [2] (step 744), and Cluster Node A (702) prunes log entries from undo log A with an epoch less than the minimum lvepoch [2] (step 746).

Embodiments of the invention may be implemented on virtually any type of computer regardless of the platform being used. For example, each of the Client Nodes and Server Nodes as described above with respect to FIG. 1 may correspond to a computer system including one or more processor(s), associated memory (e.g., random access memory (RAM), cache memory, flash memory, etc.), a storage device (e.g., a hard disk(s), an optical drive such as a compact disk drive or digital video disk (DVD) drive, flash memory, etc.), and numerous other elements and functionalities typical of today's computers. The computer system may also include input means, such as a keyboard, a mouse, or a microphone. Further, the computer system may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Further, the computer system includes at least the minimal processing, input, and/or output means necessary to particularly practice embodiments of the invention.

Further, those skilled in the art will appreciate that one or more elements of the aforementioned computer system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium, embodying instructions executable by the computer to perform method steps for performing a distributed transaction of a plurality of nodes, the instructions comprising functionality to:
   in response to receiving a lock request comprising a first message epoch from a first cluster node of the plurality of nodes, set a first local epoch to a maximum of the first message epoch and the local epoch to obtain a second local epoch;
   send a first lock comprising the second local epoch to the first cluster node;
   in response to receiving a conflicting lock request comprising a second message epoch from a second cluster node of the plurality of nodes, set the second local epoch to a maximum of the second message epoch and the second local epoch to obtain a third local epoch, wherein the conflicting lock request is delayed until after the first lock is released;
   in response to receiving a reintegration request comprising a third message epoch from the first cluster node, set the third local epoch to a maximum of the third message epoch and the third local epoch to obtain a fourth local epoch;
   perform a reintegration based on the reintegration request, wherein the reintegration is logged using the fourth local epoch;
   receive a lock release request comprising a fourth message epoch from the first cluster node; and
   after setting the fourth local epoch to a maximum of the fourth message epoch and the fourth local epoch to obtain a fifth local epoch, release the first lock and send a second lock comprising the fifth local epoch to the second cluster node.

2. The non-transitory computer readable medium of claim 1, the instructions further comprising functionality to:
   receive a preparation message for an eviction of the first cluster node from the second cluster node;
   determine a plurality of locks comprising the first lock that is granted to the first cluster node;
   determine a plurality of records protected by the plurality of locks;
   send the plurality of records to the second cluster node;
   receive a recovery message comprising a minimum oldest locally volatile epoch (lvepoch) of the plurality of records from the second node; and
   undo updates with epochs greater than or equal to the lvepoch.

3. The non-transitory computer readable medium of claim 1, the instructions further comprising functionality to:
   in response to committing the reintegration to persistent storage, update an oldest locally volatile epoch (lvepoch) with the fourth local epoch;
   send the lvepoch to a stability coordinator;
   receive a minimum lvepoch of the plurality of nodes from the stability coordinator; and
   delete undo log entries associated with epochs less than the minimum lvepoch.

4. The non-transitory computer readable medium of claim 3, wherein the first cluster node deletes redo log entries associated with the undo log entries.

5. The non-transitory computer readable medium of claim 1, the instructions further comprising functionality to:
   after recovering from a failure, send an oldest locally volatile epoch (lvepoch) to a recovery coordinator;
   receive a minimum lvepoch of the plurality of nodes from the recovery coordinator; and
   in response to determining that the second maximum epoch of the reintegration is greater than or equal to the minimum lvepoch, undo the reintegration.

6. The non-transitory computer readable medium of claim 1, the instructions further comprising functionality to:
   advance the fourth local epoch to obtain a fifth local epoch; and broadcast the fifth local epoch to each of the plurality of nodes.

7. The non-transitory computer readable medium of claim 1, wherein the first local epoch is set to the second local epoch in a first assignment, and wherein the first lock comprises a lock epoch, and wherein the lock epoch is set to the second local epoch in a second assignment, and wherein the first assignment and the second assignment are mutually atomic.

8. A system for performing a distributed transaction of a plurality of nodes, comprising:
   a processor; and
   a memory comprising software instructions for enabling the processor to:
      in response to receiving a lock request comprising a first message epoch from a first cluster node of the plurality of nodes, set a first local epoch to a maximum of the first message epoch and the local epoch to obtain a second local epoch;
      send a first lock comprising the second local epoch to the first cluster node;
      in response to receiving a conflicting lock request comprising a second message epoch from a second cluster node of the plurality of nodes, set the second local epoch to a maximum of the second message epoch and the second local epoch to obtain a third local epoch, wherein the conflicting lock request is delayed until after the first lock is released;
      in response to receiving a reintegration request comprising a third message epoch from the first cluster node, set the third local epoch to a maximum of the third message epoch and the third local epoch to obtain a fourth local epoch;
      perform a reintegration based on the reintegration request, wherein the reintegration is logged using the fourth local epoch;
      receive a lock release request comprising a fourth message epoch from the first cluster node; and
      after setting the fourth local epoch to a maximum of the fourth message epoch and the fourth local epoch to obtain a fifth local epoch, release the first lock and send a second lock comprising the fifth local epoch to the second cluster node.

9. The system of claim 8, the software instructions further for enabling the processor to:
   receive a preparation message for an eviction of the first cluster node from the second cluster node;
   determine a plurality of locks comprising the first lock that is granted to the first cluster node;
   determine a plurality of records protected by the plurality of locks;
   send the plurality of records to the second cluster node;
   receive a recovery message comprising a minimum oldest locally volatile epoch (lvepoch) of the plurality of records from the second node; and
   undo updates with epochs greater than or equal to the lvepoch.

10. The system of claim 8, the software instructions further for enabling the processor to in response to committing the reintegration to persistent storage, update an oldest locally volatile epoch (lvepoch) with the fourth local epoch;
    send the lvepoch to a stability coordinator;
    receive a minimum lvepoch of the plurality of nodes from the stability coordinator; and
    delete undo log entries associated with epochs less than the minimum lvepoch.

11. The system of claim 10, wherein the first cluster node deletes redo log entries associated with the undo log entries.

12. The system of claim 8, the software instructions further for enabling the processor to
    after recovering from a failure, send an oldest locally volatile epoch (lvepoch) to a recovery coordinator;
    receive a minimum lvepoch of the plurality of nodes from the recovery coordinator; and
    in response to determining that the second maximum epoch of the reintegration is greater than or equal to the minimum lvepoch, undo the reintegration.

13. The system of claim 8, the software instructions further for enabling the processor to
    advance the fourth local epoch to obtain a fifth local epoch; and
    broadcast the fifth local epoch to each of the plurality of nodes.

14. The system of claim 8, wherein the first local epoch is set to the second local epoch in a first assignment, and wherein the first lock comprises a lock epoch, and wherein the lock epoch is set to the second local epoch in a second assignment, and wherein the first assignment and the second assignment are mutually atomic.

* * * * *